H. A. Daniels,
Lubricator.
No. 4,131. Reissued Sept. 27. 1870.
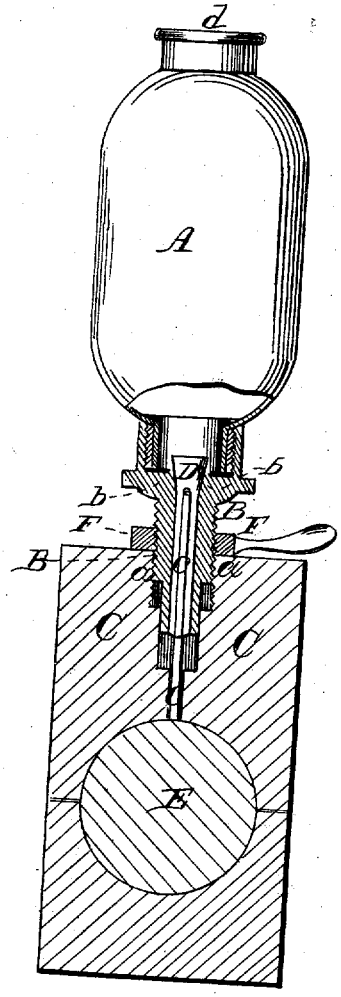
Witnesses:
J. Hirchman
Jno. H. Brooks
Inventor:
H. A. Daniels
Per Munn & Co
Attorneys.
N. PETERS, PHOTO-LITHOGRAPHER, WASHINGTON, D. C.

United States Patent Office.

HENRY A. DANIELS, OF WATERBURY, CONNECTICUT, ASSIGNOR TO THE DANIELS NICHOLS & GAYLORD MANUFACTURING COMPANY, OF SAME PLACE.

Letters Patent No. 92,283, dated July 6, 1869; reissue No. 4,131, dated September 27, 1870.

IMPROVEMENT IN LUBRICATORS.

The Schedule referred to in these Letters Patent and making part of the same

*To all whom it may concern:*

Be it known that the following is a full, clear, and exact description of an Improvement in Lubricators, invented by HENRY A. DANIELS, of Waterbury, in the county of New Haven and State of Connecticut, formerly of Thomaston, in the county of Litchfield and said State, reference being had to the accompanying drawing forming part of this specification.

The drawing represents a sectional side view of the improved lubricator.

This invention relates to that class of lubricators for the journals of shafting which are provided with shanks, adapted to enter the top of the journal-box, and which contain loose stems or plungers, extending upward within the oil-cup, to direct or control the flow from the cup; and The invention consists in forming a conical valve upon the upper portion of the stem, and in making the shank adjustable relatively to the valve, so that, when the shank or body of the lubricator is raised sufficiently above the journal-box, the valve will be closed, and made to cut off the supply of oil from the cup, as will be hereinafter more fully described.

Under such an arrangement or combination of parts, it is necessary that the stem carrying the valve on its upper end should be supported independently of the valve-seat, so that it is incapable of dropping with the downward or opening adjustment of the seat. To this end, it may be made to rest on the journal of the shaft, which is the arrangement represented in the drawing, but the invention is not restricted to such support of the valvular stem.

In the accompanying drawing—

A represents the oil-cup, made of glass or other suitable material, screwed or otherwise fastened to a tubular shank, B, on which an external screw-thread, *a*, is formed, as shown.

The shank can thus be secured into the journal-box C, and can be turned higher or lower at will.

D is the valve. It is adapted to close upon a seat, *b*, formed in the cup, and has its stem *c* reaching through and beyond the shank, as shown.

The lower end of the stem *c* rests on the shaft E when the valve is open, the cup being turned down far enough to carry the seat *b* the requisite distance away from the valve.

When, however, the cup is screwed up, it will elevate the valve-seat and raise the valve, so as to close the opening, and prevent the further escape of lubricating matter.

The cup has a suitable cover, *d*, which, when opened, allows the filling of the cup.

F is a jam-nut, which is applied around the shank above the journal, to lock the cup in any desired position.

What is here claimed, and desired to be secured by Letters Patent, is—

The conical valve D, constructed, as described, upon the upper end of the stem *c*, in combination with the adjustable shank B, carrying the oil-cup, whereby, when the shank B is sufficiently elevated above the journal-box, the valve is seated, and the supply of oil cut off, substantially as herein shown and described.

HENRY A. DANIELS.

Witnesses:

HENRY A. BOUGHTON,
THOMAS DONOHUE, 2d.